US011964183B2

(12) United States Patent
Nakamura

(10) Patent No.: US 11,964,183 B2
(45) Date of Patent: Apr. 23, 2024

(54) EXERCISE ASSISTING TOOL AND METHOD FOR USING EXERCISE ASSISTING TOOL

(71) Applicant: Jupiter Limited Liability Company, Tokyo (JP)

(72) Inventor: Hiroshi Nakamura, Tokyo (JP)

(73) Assignee: Jupiter Limited Liability Company (JP)

( * ) Notice: Subject to any disclaimer, the term of this patent is extended or adjusted under 35 U.S.C. 154(b) by 0 days.

(21) Appl. No.: 17/593,589

(22) PCT Filed: Mar. 23, 2020

(86) PCT No.: PCT/JP2020/012700
§ 371 (c)(1),
(2) Date: Sep. 21, 2021

(87) PCT Pub. No.: WO2020/196399
PCT Pub. Date: Oct. 1, 2020

(65) Prior Publication Data

US 2022/0168609 A1 Jun. 2, 2022

(30) Foreign Application Priority Data

Mar. 22, 2019 (JP) ................................ 2019-055324

(51) Int. Cl.
*A63B 23/02* (2006.01)
*A61H 1/02* (2006.01)

(52) U.S. Cl.
CPC ....... *A63B 23/0238* (2013.01); *A61H 1/0292* (2013.01); *A63B 23/0244* (2013.01);
(Continued)

(58) Field of Classification Search
CPC ............ A63B 23/0238; A63B 23/0244; A63B 2208/0228; A63B 2208/0252;
(Continued)

(56) References Cited

U.S. PATENT DOCUMENTS 3,633,907 A * 1/1972 Cane .................... A63B 23/129 482/123
3,744,483 A * 7/1973 Picolin .................. A61H 7/001 4/581

(Continued)

FOREIGN PATENT DOCUMENTS

CN 102179035 A 9/2011
JP 3829257 7/2006

(Continued)

OTHER PUBLICATIONS

[online], Oct. 5, 2016 [retrieved: May 19, 2020], Internet: URL: https://ameblo.jp/sympathy-booth/entry-12206818774.html>, see the statement “Put a Half-Stretch Pole Along Your Back”, etc., non-official translation (Beginnner’s Bodybuilding, Beginner’sGym Routine.).

*Primary Examiner* — Garrett K Atkinson
(74) *Attorney, Agent, or Firm* — BARNES & THORNBURG LLP; Jeffrey R. Stone

(57) ABSTRACT

An exercise assist tool is used together with an exercise tool used in a supine or seated state, and the exercise assist tool includes a body-axis indicator that allows a user to be conscious of a body axis. The body-axis indicator has a longitudinal direction, and is supported such that the longitudinal direction can be disposed along a craniocaudal axis of the user. The body-axis indicator is a rod member supported so as to be disposed along a craniocaudal axis of the user. The body-axis indicator includes a proximal-side indicator provided in front of a face of the user, and a distal-side indicator provided farther from the user than the proximal-side indicator. The proximal-side indicator is configured to be capable of adjusting a distance from the user.

4 Claims, 8 Drawing Sheets

(52) U.S. Cl.
CPC ................ *A61H 2203/0425* (2013.01); *A61H 2203/0456* (2013.01); *A63B 2208/0228* (2013.01); *A63B 2208/0252* (2013.01)

(58) Field of Classification Search
CPC .......... A63B 2071/0652; A63B 21/068; A63B 23/0216; A63B 71/0608; A63B 2023/003; A63B 21/4037; A63B 71/00; A63B 2209/08; A63B 2210/52; A63B 2210/50; A61H 1/0292; A61H 2203/0425; A61H 2203/0456; A61H 2201/0192; A61H 2203/0431; A61H 5/00; A61H 2201/0119; A47G 27/0231; A47G 27/0237; A47G 9/062; A47G 27/04; A47G 27/0412; A47G 2200/106; A44B 99/00; A44D 2203/00
See application file for complete search history.

(56) References Cited

U.S. PATENT DOCUMENTS

| | | | | | |
|---|---|---|---|---|---|
| 5,951,448 | A * | 9/1999 | Bolland | F16K 13/06 | 482/137 |
| 6,402,669 | B1 * | 6/2002 | Olstad | A63B 21/045 | 482/148 |
| 6,932,748 | B2 * | 8/2005 | Huang | A63B 21/4001 | 482/102 |
| 7,824,317 | B2 * | 11/2010 | Nakamura | A63B 21/4047 | 482/134 |
| D674,225 | S * | 1/2013 | Boyer | A61H 1/0229 | D6/582 |
| 9,211,437 | B2 * | 12/2015 | Soba | A63B 21/15 | |
| 9,737,744 | B2 * | 8/2017 | Austin | A63B 21/4005 | |
| 11,383,129 | B2 * | 7/2022 | Boddie | A63B 23/1245 | |
| 2005/0192158 | A1 * | 9/2005 | Edwards | A63B 6/00 | 482/148 |
| 2009/0062076 | A1 * | 3/2009 | Curley | A63B 26/00 | 482/23 |
| 2011/0131723 | A1 * | 6/2011 | Andrews | A45F 3/14 | 5/417 |
| 2012/0324645 | A1 * | 12/2012 | Lehr | A47G 27/0237 | 5/420 |
| 2013/0180048 | A1 * | 7/2013 | Saltzman | A63B 21/00178 | 5/417 |
| 2015/0328495 | A1 * | 11/2015 | Soba | A63B 21/4035 | 5/417 |
| 2016/0016028 | A1 * | 1/2016 | Thompson | A63B 21/4037 | 5/417 |
| 2018/0353800 | A1 * | 12/2018 | Calvaruso | A63B 21/4037 | |
| 2022/0096306 | A1 * | 3/2022 | Bilek | A61H 1/0229 | |

FOREIGN PATENT DOCUMENTS

| | | |
|---|---|---|
| JP | 6088110 | 2/2017 |
| JP | 2017080068 A | 5/2017 |
| KR | 101893362 B1 | 8/2018 |

* cited by examiner

EXERCISE ASSISTING TOOL AND METHOD FOR USING EXERCISE ASSISTING TOOL

TECHNICAL FIELD

The present invention relates to an exercise assist tool used together with an exercise tool used in a supine or seated state, and a method for using the exercise assist tool.

BACKGROUND ART

Conventionally, an abdominal and lumbar muscles training tool for strengthening various muscles of the abdomen and the waist is known (Patent Literatures 1 and 2). Each of the abdominal and lumbar muscles training tools of Patent Literatures 1 and 2 includes a self-weight pressing plate on which a user can lie on his/her back or sit, a movable body that can swing so as to be raised and lowered in an intermediate portion of the self-weight pressing plate, and means that applies a resistance force in a swing direction of the movable body, and is configured to perform exercise of turning the lumbar spine by inclining the movable body to the left and right in a state where the movable body is sandwiched between both legs of the user.

According to the abdominal and lumbar muscles training tools of Patent Literatures 1 and 2, it is possible to efficiently apply a load to the entire abdominal muscles including the external oblique muscle, the internal oblique muscle, and the transversus abdominis muscle by such turning exercise of the lumbar spine. Therefore, it is possible to practice exercise with a high shape-up effect and to strengthen the muscles around the abdomen and waist (the muscles of the core of the body). In addition, since it is possible to naturally perform the turning exercise of the lumbar spine by inclining the knee to the left and right with the knee bent in the supine state, it is also possible to strengthen the muscles around the lumbar spine and to adjust the balance of the positions of the respective vertebras constituting the spine.

CITATION LIST

Patent Literature

Patent Literature 1: JP 3829257 B2
Patent Literature 2: U.S. Pat. No. 7,824,317

SUMMARY OF INVENTION

Technical Problem

As described above, the abdominal and lumbar muscles training tools of Patent Literatures 1 and 2 are innovative exercise tools capable of easily performing, at home, work, and the like, such muscle strength enhancement, shape up by curve formation around the waist, health promotion of the elderly, rehabilitation exercise after a disease, low back pain treatment by strengthening muscles around the lumbar spine, and the like. Then, the inventor of the present invention has found that it is effective to suppress the movement of the body axis of the user, in particular, the craniocaudal axis during the turning exercise of the lumbar spine in order to maximally exhibit the effect of the abdominal and lumbar muscles training tool from the long-time experience of using such an abdominal and lumbar muscles training tool.

It is an object of the present invention to provide an exercise assist tool capable of suppressing movement of a body axis of a user during exercise with an exercise tool used in a supine or seated state, and a method for using the exercise assist tool.

Solution to Problem

In order to achieve the above object, according to the present invention, there is provided an exercise assist tool, which is used together with an exercise tool used in a supine or seated state, the exercise assist tool including a body-axis indicator that allows a user to be conscious of a body axis.

In the exercise assist tool according to the present invention, it is preferable that the body-axis indicator has a longitudinal direction, and is supported such that the longitudinal direction can be disposed along a craniocaudal axis of the user.

Further, in the exercise assist tool according to the present invention, the body-axis indicator may be a rod member supported so as to be disposed along a craniocaudal axis of the user.

Furthermore, in the exercise assist tool according to the present invention, it is preferable that the body-axis indicator includes a proximal-side indicator provided in front of a face of the user, and a distal-side indicator provided farther from the user than the proximal-side indicator.

In this case, it is more preferable that the proximal-side indicator is configured to be capable of adjusting a distance from the user.

Further, according to the present invention, there is provided a method for using an exercise assist tool together with an exercise tool used in a supine or seated state, the exercise assist tool including a body-axis indicator having a longitudinal direction, and a support portion that supports the body-axis indicator such that the longitudinal direction of the body-axis indicator can be disposed along a craniocaudal axis of a user, the method including using the exercise tool in a state where the exercise assist tool is disposed such that the longitudinal direction of the body-axis indicator is along the craniocaudal axis of the user.

Advantageous Effects of Invention

According to the present invention, it is possible to provide the exercise assist tool capable of suppressing movement of the body axis of the user during exercise with the exercise tool used in a supine or seated state, and the method for using the exercise assist tool.

DESCRIPTION OF EMBODIMENTS

Hereinafter, preferred embodiments for carrying out the present invention will be described with reference to the drawings. The following embodiments do not limit the invention according to each claim, and all combinations of features described in the embodiments are not necessarily essential to the solution of the invention. In addition, an exercise assist tool according to the present invention is not limited to the illustrated example, and the design can be appropriately changed according to the body type, sex, age, muscle strength, symptom, and the like of a user within the scope of achieving the object of the present invention.

Figure 1:
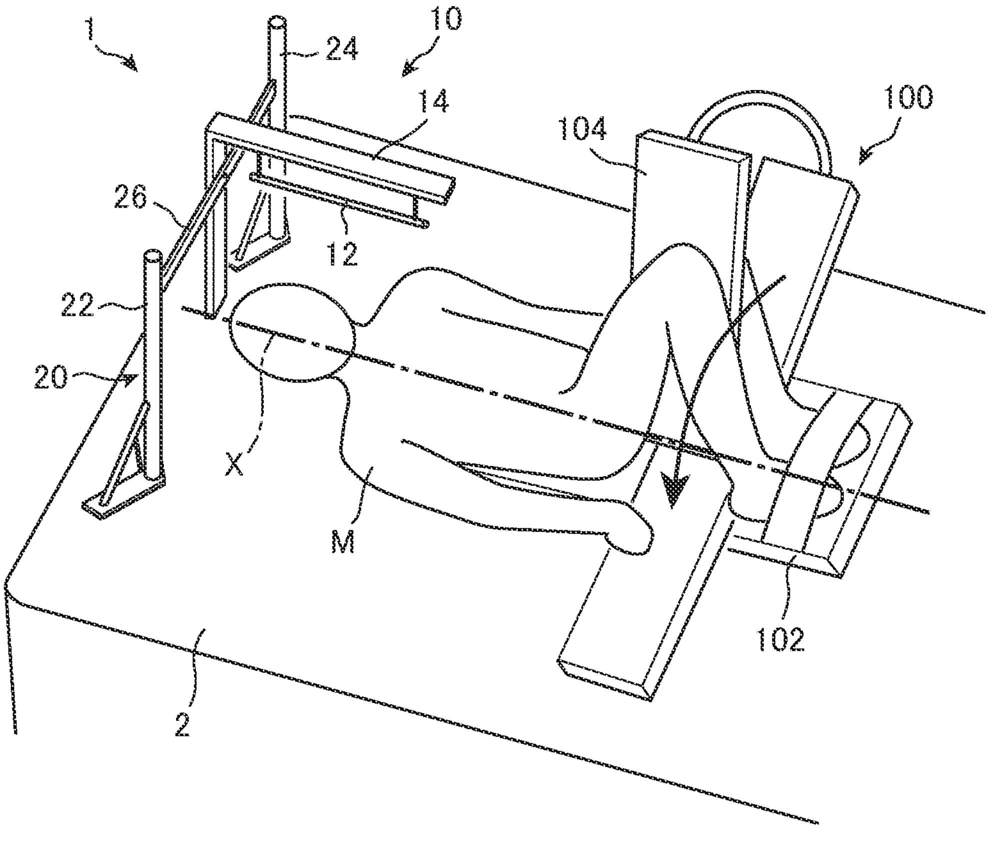
FIG. 1 is a view illustrating an exercise assist tool according to the present embodiment together with an exercise tool.

An exercise assist tool 1 according to the present embodiment is an exercise assist tool used together with an exercise tool 100 used in a supine or seated state, and includes a body-axis indicator 10 that allows a user M to be conscious of a body axis, particularly a craniocaudal axis X, and a support portion 20 that supports the body-axis indicator 10 as illustrated in FIG. 1.

As illustrated in FIG. 1, the support portion 20 can be placed on a bed 2 on which the user M lies on his back, and is configured to be able to support the body-axis indicator 10 such that the body-axis indicator 10 is located in front of the face of the user M in the supine state. Specifically, the support portion 20 includes a pair of leg portions 22 and 24, and a suspension portion 26 bridged between the leg portions 22 and 24, and supports the body-axis indicator 10 at a substantially central portion of the suspension portion 26 in the longitudinal direction (direction from one leg portion 22 toward the other leg portion 24). The pair of leg portions 22 and 24 are spaced apart from each other with an interval allowing the user M to enter therebetween, for example, an interval slightly larger than the shoulder width of the user M.

Figure 2:
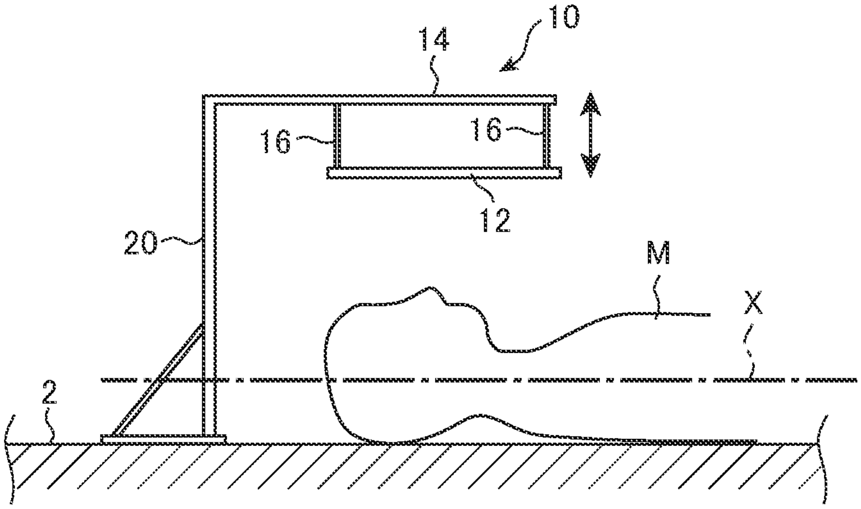
FIG. 2 is a side view illustrating a schematic configuration of the exercise assist tool according to the present embodiment.

As illustrated in FIGS. 1 and 2, the body-axis indicator 10 includes a proximal-side indicator 12 provided in front of the face of the user M, and a distal-side indicator 14 provided farther from the user M than the proximal-side indicator 12. In the present embodiment, each of the proximal-side indicator 12 and the distal-side indicator 14 is a long member having a longitudinal direction, specifically, a rod member extending along the craniocaudal axis X of the user M. The proximal-side indicator 12 and the distal-side indicator 14 have a length of about the length of the face along the craniocaudal axis X direction of the user M, for example, an axial length of about 10 to 30 cm. The proximal-side indicator 12 has a narrower width than the distal-side indicator 14. In the present embodiment, the proximal-side indicator 12 is formed of a thin round rod, and the distal-side indicator 14 is formed of a long flat plate.

As illustrated in FIG. 1, the distal-side indicator 14 is formed in an L shape in which a base end portion is bent downward, and the bent portion is fixed to the suspension portion 26 of the support portion 20. As illustrated in FIG. 2, the proximal-side indicator 12 is suspended from a horizontal portion of the distal-side indicator 14 by connecting members 16 such as string. The connecting members 16 are configured to be adjustable in length, so that the proximal-side indicator 12 can adjust the distance to the user M and can adjust the distance to the distal-side indicator 14.

The exercise tool 100 is not particularly limited as long as it is an exercise tool used in a supine or seated state, but for example, an abdominal and lumbar muscles training tool as illustrated in FIG. 1 can be used. As illustrated in FIG. 1, the abdominal and lumbar muscles training tool 100 includes a self-weight pressing plate 102 on which a user can lie on his/her back or sit, a movable body 104 that can swing so as to be raised and lowered in an intermediate portion of the self-weight pressing plate 102, and means (not illustrated) that applies a resistance force in a swing direction of the movable body 104, and is configured to perform exercise of turning the lumbar spine by inclining the movable body 104 to the left and right in a state where the movable body 104 is sandwiched between both legs of the user. The abdominal and lumbar muscles training tool 100 may have a configuration in which the self-weight pressing plate 102 is integrated with the bed 2, or a configuration in which the movable body 104 is directly attached to the bed 2 without providing the self-weight pressing plate 102.

The abdominal and lumbar muscles training tool 100 can efficiently apply a load to the entire abdominal muscles including the external oblique muscle, the internal oblique muscle, and the transversus abdominis muscle by such turning exercise of the lumbar spine, and it is possible to practice exercise with a high shape-up effect and to strengthen the muscles around the abdomen and waist (the muscles of the core of the body). In addition, since, with the abdominal and lumbar muscles training tool 100, it is possible to naturally perform the turning exercise of the lumbar spine by inclining the knee to the left and right with the knee bent in the supine state, it is also possible to strengthen the muscles around the lumbar spine and to adjust the balance of the positions of the respective vertebras constituting the spine. Furthermore, since the abdominal and lumbar muscles training tool 100 has a simple structure and can be carried, it is possible to easily perform, at home, work, and the like, such muscle strength enhancement, shape up by curve formation around the waist, health promotion of the elderly, rehabilitation exercise after a disease, low back pain treatment by strengthening muscles around the lumbar spine, and the like.

It is possible to use the known devices disclosed in JP 3829257 B2 (Patent Literature 1) and U.S. Pat. No. 7,824,317 (Patent Literature 2) as such an abdominal and lumbar muscles training tool 100, and thus a detailed description thereof will be omitted.

Next, a method for using the exercise assist tool 1 according to the present embodiment will be described.

As illustrated in FIG. 1, the user M lies on his/her back on the bed 2, and sandwiches the movable body 104 of the exercise tool 100 with both the legs. In this state, the exercise assist tool 1 according to the present embodiment is disposed in front of the face of the user M. At this time, the longitudinal direction (extending direction) of the body-axis indicator 10 is disposed along the craniocaudal axis X of the user M. In this state, by swinging the movable body 104 to the left and right, the turning exercise of the lumbar spine is performed.

Here, the exercise assist tool 1 according to the present embodiment includes the body-axis indicator 10 that allows the user M to be conscious of the craniocaudal axis X. Therefore, while repeatedly executing the turning exercise using the exercise tool 100, the user M can always be conscious of its own craniocaudal axis X of the user M by the body-axis indicator 10. As a result, it is possible to correct its own posture appropriately at the stage of recognizing the movement of its own craniocaudal axis X with respect to the body-axis indicator 10 and always perform the turning exercise in an appropriate posture, generally, a straight posture in which a line connecting the top of its own head and the turning axis of the exercise tool 100 coincides with its own craniocaudal axis X, and thus, it is possible to suppress the movement of the body axis during the exercise and to improve the exercise efficiency and the effect.

In particular, since the body-axis indicator 10 is a rod member extending along the craniocaudal axis X of the user M, the exercise assist tool 1 according to the present embodiment has an advantage that it is possible to further easily recognize the movement of the craniocaudal axis X, and it is possible to cope with the user M (an adult, a child, or the like) having different heights without adjusting the position of the exercise assist tool 1 or only with slight position adjustment.

In addition, in the exercise assist tool 1 according to the present embodiment, since the body-axis indicator 10 includes the proximal-side indicator 12 provided in front of the face of the user M, and the distal-side indicator 14 provided farther from the user M than the proximal-side indicator 12, it is possible to more accurately recognize the movement of the craniocaudal axis X and to suppress the movement.

Figure 3:
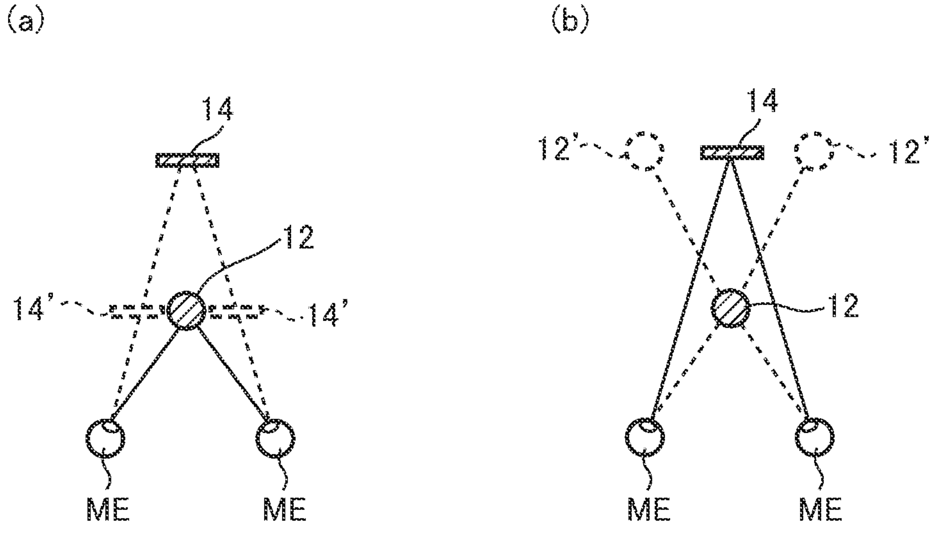
FIG. 3(*a*) is a schematic view illustrating a state in which a viewpoint is adjusted to a proximal-side indicator, and FIG. 3(*b*) is a schematic view illustrating a state in which the viewpoint is adjusted to a distal-side indicator.

That is, as illustrated in FIG. 3(*a*), in a state in which the body-axis indicator 10 according to the present embodiment is disposed in front of the eyes of the user M, when the viewpoint is adjusted to the proximal-side indicator 12, a distal-side indicator 14' viewed from the right eye and a distal-side indicator 14' viewed from the left eye are visually recognized separately in two in eyes ME of the user M on the left and right sides with the proximal-side indicator 12 as the center. At this time, in a case where the proximal-side indicator 12 is located exactly at the center of the distal-side indicators 14' and 14' viewed separately to left and right (if the intervals between the proximal-side indicator 12 and the distal-side indicators 14', 14' viewed separately to left and right are equal), it means that the face is located directly below the body-axis indicator 10, that is, that the craniocaudal axis X of the user M and the extending direction of the body-axis indicator 10 three-dimensionally coincide in both the horizontal direction and the vertical direction.

Therefore, the user M can recognize not only the craniocaudal axis X but also the movement of the dorsoventral axis (axis along the dorsoventral direction of the body) and the left-right axis (axis along the shoulder width direction of the body). As a result, the user M can more accurately recognize the movement of the body axis (craniocaudal axis, dorsoventral axis, left-right axis), and can more reliably suppress the movement of the body axis by appropriately paying attention or performing posture adjustment such that the proximal-side indicator 12 is located exactly at the center of the distal-side indicators 14' and 14' viewed separately to left and right. The same applies to a case where the proximal-side indicator 12 (12', 12') is visually recognized separately by adjusting the viewpoint to the distal-side indicator 14, as illustrated in FIG. 3(*b*).

Furthermore, since, with the exercise assist tool 1 according to the present embodiment, it is also possible to train eye muscles (muscles around the eyes) by alternately adjusting the viewpoint to both the proximal-side indicator 12 and the distal-side indicator 14, it is also possible to exhibit effects of vision correction and presbyopia correction. In particular, by training the eye muscles by constantly using the exercise assist tool 1 according to the present embodiment, not only an effect of restoring vision and an effect of improving presbyopia but also an effect of improving cataract and glaucoma can be expected. Furthermore, improvement in command ability to muscles and muscle fibers by the optic nerve from the brain and the motor nerve leads to improvement in exercise ability, which can greatly contribute to an aging society. As described above, the exercise assist tool 1 according to the present embodiment can be used as an eye function correction tool alone.

In addition to or instead of the configurations of the proximal-side indicator 12 and the distal-side indicator 14, by providing an additional mark on a ceiling, a wall, or the like, it is also possible to perform eye muscle training of alternately viewing the body-axis indicator 10 and the mark.

Here, the "mark" preferably has one or a plurality of left-right axis lines extending along the left and right axis (axis along the shoulder width direction of the body), and in addition to this, the "mark" more preferably further includes a craniocaudal axis line extending along the craniocaudal axis X. As such a "mark", for example, a character such as "step" can be employed, but it is not limited thereto. By adopting such a mark having the left-right axis line, it is possible to be conscious of the left-right axis by the left-right axis line, and thus, it is possible to more reliably suppress the movement of the body axis.

In particular, in a case where the mark is adopted as an alternative configuration of the distal-side indicator 14, when the viewpoint is adjusted to the proximal-side indicator 12, the mark is visually recognized separately in two on the left and right sides with the proximal-side indicator 12 as the center. In such a state, when the mark viewed separately in two is visually recognized symmetrically with respect to the proximal-side indicator 12 (when the positions of the mark viewed separately in two are parallel to the left-right direction), it means that the neck is straight with respect to the craniocaudal axis X, and when the mark viewed separately in two is visually recognized asymmetrically with respect to the proximal-side indicator 12 (when the positions of the mark viewed separately in two are not parallel to the left-right direction), it means that the neck is inclined with respect to the craniocaudal axis X. Therefore, in a case where the mark is adopted as an alternative configuration of the distal-side indicator 14, not only the craniocaudal axis X but also the inclination of the neck can be recognized and corrected.

Furthermore, in the exercise assist tool 1 according to the present embodiment, since the proximal-side indicator 12 is configured to be able to adjust the distance to the user M, it is possible to cope with the user M (an adult, a child, or the like) having different face sizes and to perform reasonable eye muscle training according to the level of the eye function (the degree of vision or presbyopia).

Then, according to the exercise assist tool 1 of the present embodiment, as described above, it is possible to suppress the movement of the body axis during the exercise, so that it is possible to maximize the exercise effects of the abdominal and lumbar muscles training tool 100. Here, the exercise effects of the abdominal and lumbar muscles training tool 100 will be exemplified by being classified into the following viewpoints (1) to (6).

(1) Effects on folk therapy performed as private practice
(2) Effect on treatment performed by doctor
(3) Higher effect than personal trainer
(4) Higher effect than walking lesson instructor
(5) Higher effect than care instructor
(6) Higher effect than treatment effect and preventive effect of oriental medicine (1) Effects on Folk Therapy Performed as Private Practice Each block of the spine is balanced.

When the skull is correct on the backbone, the distortion of the face is improved.

Each block of the backbone is balanced while strengthening the muscles.

The trunk axis is corrected to correct the hunched back.

The distortion of the face and body is corrected while strengthening the muscles.

The skull is placed correctly on the backbone without touching the face. The position of the skull is also corrected and adjusted by the correction effect of the fascia connected through the entire body from the neck to the top of the head.

The walking motion is adjusted.

The flexibility of the backbone contradictory from the viewpoint of the process of evolution (the cervical spine and the lumbar spine are kyphotic when the human being who was originally quadruped walking became upright bipedal walking) is increased.

Small face effect.

Elimination of sagging around the submandibular region and double jaw.

Skin beautifying effect.

Anti-aging effect.

Effect of eliminating and improving face sagging.

The distortion of the face is corrected as approach is made to the skull from the fascia of the entire body without touching the face. The distortion of the face is corrected as compared to the procedure of touching the face.

This is effective for the distortion of the skull, so-called face distortion.

At present, there are many people whose skull is not placed straight at a correct position on the backbone. The problem is that many therapists, practitioners, and therapeutists who claim to form a small face and correct face distortions advertise that they have made changes by marketing and advertising well despite there being no technique to correct them radically.

The body is covered with the fascia up to the top of the skull. As an example of the way of distortion, the fact that the face is inclined means, at present, that the balance of each block of the backbone is bad because the cervical spine and the backbone are inclined, and in addition, the way of using the muscles and the balance of the muscles are bad, and in the methods that are currently performed in the world, for example, chiropractic, bodywork, correction, stretching, posture class, walking class, and a treatment method that advertises that face distortion can be corrected as selling points cannot exhibit sufficient effects even if a massage bed, a bodywork item, a stretch therapy instrument, a medical instrument, and a cosmetic instrument are used in addition to manual therapy. This is because, since the treatment is often performed in a state where gravity is applied to the backbone, a large amount of pressure is applied between the blocks of the backbone, and hence the effect of the bodywork and correction is not sufficiently exerted. In addition, since approach is made from the skin surface such that the muscles and fascia are stretched or the positions of the bones are pushed in with the muscle balance in which the balance of each block of the backbone is shifted, and the muscles are not strengthened so that the positions of each block of the backbone are adjusted, and hence the blocks are shifted and the backbone is distorted to the end when the person starts walking. The exercise therapy performed in a supine state in a state in which the skull is not shifted with use of the present invention has a high effect of correcting the body wobbling during walking by being performed by a method in which the gravity from above is not applied to each block of the backbone. Evidence and clinical results of the inventor of the present invention show that even when various exercises such as those performed in competitions in Olympics are performed, the state in which the position of each block of the backbone is hardly shifted at the correct position is effective in preventing future deformity of the spine, spinal canal stenosis, lumbar hernia, cervical spine hernia, and the like, and improving symptoms of deformity of the spine, spinal canal stenosis, lumbar hernia, cervical spine hernia, and the like.

(2) Effect on Treatment Performed by Doctor

Orthopedic surgery field: Currently, in orthopedic surgery and the like, treatments such as hyaluronic injection, pain relief, poultice, massage, water bed, traction (poor affected parts are often hard and difficult to stretch, and it is difficult to adjust the balance only by traction), and the like are performed, but in such treatments, the position of each block of the spine remains bad for knee osteoarthritis, cervical spine spondylosis, lumbar spine spondylosis, disc herniation, sciatica, back pain, chronic low back pain, slip disease, strained back, lumbar spine spondylolysis, and the like. Walking, running, exercise, and daily life in a state in which the positions of the backbone, the knee joint, and the posture-holding joint are distorted are caused as the initial cause of these symptoms, and are also the cause of the deterioration of the symptoms and the cause of the failure to improve the symptoms. The underlying cause is approached and the effects are exerted by acquiring the way of using the body and the way of using the trunk axis in walking, running, exercise, and daily life which correct the balance of each block of the spine and do not apply a burden to each joint while strengthening the muscle strength, according to the present invention. There are many cases where the bone density is increased by performing the exercise therapy using the abdominal and lumbar muscles training tool 100. It can be said that there is no change as a root solution in the improvement of the position of the bone and the position of the joint, which are the underlying causes, by the treatment method by the conventional medicine, medical device, and manual therapy, and the root treatment of improving the distortion while strengthening the muscle strength according to the present invention is useful for the Japanese people suffering from a lot of pain.

Knee osteoarthritis: Currently, in orthopedic surgery and the like, treatments such as hyaluronic injection, pain relief, poultice, and the like are performed, but in these treatments, the load line, which is one of the underlying causes, is not adjusted. In these treatments, in knee osteoarthritis, an O leg, an X leg, or normal determined by a line that sees an angle of the knee joint on a line connecting the femoral head to the ankle called a load line is used as one indicator, but these are not treatments that correct the load line. When the load line is shifted, for example, in a case of an O leg, a burden is applied to the inside of the knee, and the joint is worn out and deformed. This is not just a knee problem. For example, even if the load line is aligned, since a person walks with the upper body wobbling, a burden is strongly applied to the knee joint, and the joint is worn out and deformed in many patients. Although rehabilitation is also performed as physical therapy, it is a reality that a sufficient effect cannot be exhibited on the load line. On the other hand, the present invention is effective for prevention, treatment, and improvement of knee osteoarthritis. The inventor of the present invention has published a book called "Knee pain disappears! 5 magical calisthenics" of the band in "Knee pain repelling method" proposed by the director of the osteotomy hospital who has examined 50,000 knee pain patients", and has proposed a method for improving the load line. However, the treatment effect of the knee osteoarthritis is small only by performing the exercise to adjust the load line, and it has been proved in many in-hospital patients that preventing the walking wobbling of the upper body during walking is effective for the treatment, prevention, and improvement of the knee osteoarthritis. As a supplementary explanation, for a symptom in which joint fluid cannot be absorbed due to inflammation caused by deformation and water accumulates, in orthopedic surgery, a treatment in which an injection needle is inserted into a knee joint and joint fluid in the joint, generally called knee water, is absorbed by a syringe is often performed. However, despite the fact the role of the joint fluid is repair and regeneration in the knee joint, the joint fluid is not guided in a direction in which the joint fluid can be absorbed by the body, whereby repair and regeneration in the knee joint do not work well, and there are confirmed many cases that a treatment in which knee water is absorbed by a syringe is periodically repeated, whereby the progress of deformation is accelerated. As a case in which joint fluid may be absorbed by the injection needle, only a case in which a large amount of joint fluid is temporarily generated, and the joint fluid is once drained by the injection needle, and then the joint fluid is not accumulated at an early stage may be indicated. However, in this case, absorption is promoted in a way of compressing the inside of the joint space, and thus the necessity of absorbing the joint fluid by the injection needle is particularly low. In order to really smoothly absorb the joint fluid and enhance the repair and regeneration in the joint, the present invention that normalizes the lateral wobbling of the upper body and the walking in a bad posture, which is more effective in reducing the fluctuation of the load line angle of the knee joint during walking and when the entire weight is applied, exerts an effect in addition to the effort to normalize the angle of the load line.

For patients with scoliosis: Follow-up is now often seen. As the treatment process, a typical example that is often seen will be described as an example. Scoliosis is first found in spinal tests and moire tests by elementary and junior high schools in many cases. Even if a patient visits the orthopedic surgery in town, the patient does not experience an improvement, and even if the patient visits the orthopedic surgery regularly, follow-up observation continues. Therefore, the patient himself/herself becomes anxious together with his/her parents, and visits a university hospital. Here, too many cases continue to be in a state of no treatment such as follow-up. When the scoliosis progresses, a corset is worn, and follow-up observation is performed, and surgery is performed when the scoliosis further progresses. At present, there are few cases where a preventive exercise or the like is instructed at the stage before and after the start of considering wearing a corset, and even if the preventive exercise or the like is instructed, there is almost no effect of improving scoliosis. Even in the case of using a corset for scoliosis, a great improvement effect cannot be obtained, and there are too many cases in which not only a great pain is felt but also a patient lives in a body in which scoliosis has progressed throughout his/her life by performing an unpleasant corset therapy in his/her growth period and adolescence. The effect of improving scoliosis by the present invention has been proved by the fact that the exercise therapy conducted in an osteotomy owned by the present inventor (hereinafter referred to as "our hospital") has many improvement results in the treatment of patients with scoliosis.

Effects of preventing three major diseases, effects of treatment of three major diseases, and effects of preventing presymptomatic disease of three major diseases:

Cancer (three major diseases); In reality, there are many cases where, since most patients with cancer have low breathing power, they are in such a posture that the front of the chest is recessed, and the progress of cancer further progresses by further lowering the breathing power, thus finally leading to death. However, when the chest is opened to be in a posture of being able to take a large breath, and the trunk axis and the posture are such that the patient can take a large breath, there is an effect that the progress of the patient with cancer is delayed and the healing power is increased, so that the cancer is cured. Such case results are found in the evidence in our hospital. In a state where the breathing power is high in a good posture, =in a state where the energy is high, there is an effect that a constitution that cancer is hardly caused is obtained.

Cerebral infarction (three major diseases); There are many cases in which a thrombus is formed, and the thrombus reaches the brain and presses a cerebral blood vessel, resulting in cerebral infarction. However, it can also be said that the thrombus is a state in which the sympathetic nerve is dominant, for example, a state in which the nerve is pressed due to the pain caused by the compression of the spine due to a poor posture, the deformation or wear of the spine, and the deformation or wear of the joint, the patient with pain at all times always has stress, is irritated, and the sympathetic nerve is dominant. Although it can be understood by considering that, originally, humans fight, that is, the period of guarding a territory or fighting an enemy, it can be said that this state is the same state, as the physical reaction, as a large stress involved in the maintenance of a life at the time of a blood-soaked battle with the enemy. In a situation where the blood is bled to death unless the blood is stopped, it is necessary to prevent the blood from flowing out into the body by solidifying the blood. This is the same as a state in which the blood is likely to coagulate, and is a state in which thrombus is likely to form. That is, to acquire the way that each block of the spine and each knee joint are at the correct positions so that the excessive burden is less likely to be applied and the joint is less worn out and deformed as a daily life and lifestyle leads to avoidance of stress of pain by a human, and thus stress due to this is also avoided, and there is an effect of preventing occurrence of cerebral infarction in advance. As a matter of course, it is also effective for prevention of recurrence in patients with cerebral infarction.

Myocardial Infarction (Three Major Diseases); There are many cases in which a thrombus is formed, and the thrombus reaches the heart and presses a blood vessel of the heart, resulting in myocardial infarction. However, as described in an example of cerebral infarction, the present invention is also effective for prevention of myocardial infarction and recurrence in patients who have once developed myocardial infarction.

In dentistry field, there are many patients with unmatched occlusion of the maxilla and mandible, but the reality is that there is play in the occlusion of the teeth, and all of them are not exactly matched. Nevertheless, it is fundamentally unreasonable to try to remedy the occlusion rather tightly. However, at present, there are many patients who report symptoms and wish to be treated for such an occlusal problem. Although it is not known as a fundamental problem of the occlusion between the maxilla and the mandible, in actually, there is a high probability that the reason is that the posture is bad and the skull is not correctly placed on the backbone. However, at present, there is no way to approach the symptoms in dental offices. Therefore, at present, it is difficult to cope with this in dental offices in town, and there are many patients who go to a university hospital and continue treatment for a long time. However, as described above, even in a university hospital, there is no treatment method for the above cause, and thus, it is a reality that many patients repeat treatment carelessly for a long time.

According to the present invention, when the relationships between the backbone and the skull, the maxilla, and the mandible are correct, there is a great medical effect on such occlusal problems of unknown cause. In addition, even for a patient who undergoes orthodontics treatment so that the teeth are properly aligned, if the skull is not correctly placed on the backbone, a state in which there is distortion between the maxilla and the mandible continues. Therefore, by performing the treatment according to the present invention, the distortion of the maxilla and the mandible is eliminated and adjusted. Therefore, the treatment effect of orthodontics is enhanced before, during, and after the start of orthodontic treatment, which can contribute to dental treatment of Japanese people. This is not only related to absorption of nutrients, but also has an effect that the nutrients that have been eaten pass through the blood to spread the nutrients throughout the body. It is possible to contribute to the quality of life of the people to enjoy a delicious and enjoyable meal for a long time.

Obstetrics and gynecology field: The present invention enhances an exercise therapy effect that can also be safely adjusted by a pregnant female. In fact, evidence has been obtained from the results in our hospital that infertility of unknown cause is often caused by poor posture and poor walking. As the poor posture, it is also a reality that there are many patients who have a posture in which the upper body is bent backward and there is almost no turning motion between the upper body and the lower body, or who have cold sensitivity to the lower body with the temperature of the uterus being low. In this hospital, there are records, evidences, and facts that, for patients who have underwent treatment in obstetrics and gynecology but suffered as being diagnosed as underlying causes being unknown, many patients who have underwent infertility treatment in our hospital are made to have a correct balance of each block of the spine of the trunk axis by several treatments, therapies, and exercise methods, and are naturally guided in a direction in which the temperature of the uterus rises during walking, so that patients who have been subjected to infertility treatment in obstetrics and gynecology for many years are pregnant by treatment performed several times. As can be seen from this, the present invention approaches the decrease in the number of children and is effective for infertility treatment of a couple who wants to have a child. From the viewpoint of oriental medicine, the present invention that adjusts qi blood water to enhance the preventive medical effect is effective for uterus myoma, ovarian cysts, menstrual cramps, PMS, menstrual disorder, and infertility of gynaecological diseases.

Psychiatric field: There are many patients suffering from psychiatric disorders and having taken many medications for many years. Since many of these patients do not have energy, most of them do not have a regular exercise habit, and it is a reality that the muscle strength decreases significantly year by year. At the same time, the energy also decreases, and naturally, the posture is bad and the walking speed is slow, so that symptoms of being spiritless on the whole get worse and worse. According to the present invention, the muscle strength of the whole body can effectively perform the exercise performed in the state of only lying on the back or sitting, so that the exercise effect can be enhanced in the optimization, the energy can be enhanced from the body, and the daily living ability can be enhanced, which can be useful for improving the mental symptom.

Internal medicine field: A person tries to balance his/her body by the autonomic nerve, but the brain is greatly involved in the balance. While the brain is protected by the skull, it is the central nerve that sends the correct command from the brain to the body. What is really important is the balance of the spine, which is the path of the central nerve that sends the command from the brain to the body, and it is now common knowledge that the deformation of the spine is related to the balance of the autonomic nerve of the whole body and causes various diseases and injuries. The present invention has an effect of improving the healing power against all diseases and injuries and preventing presymptomatic disease by adjusting each balance of the spinal blocks, thus leading to the body where pain is less likely to occur. Therefore, from the viewpoint of oriental medicine, the present invention, which is also intended to adjust qi blood water, is effective for visceral diseases and symptoms such as hypertension, hyperglycemia, hypercholesterolemia, hypotension, hypoglycemia, dyslipidemia, abnormal bowel movement (constipation, diarrhea, etc.), indigestion, cystitis, frequent urination, stomach pain, liver dysfunction, and kidney dysfunction. From such a viewpoint, there is a positive effect on the homeostasis of the body. The autonomic nerve transmits the command from the brain to the body through the central nerve, and if the positions of the spine and spinal cord around the central nerve through which the autonomic nerve passes are shifted, disorders of internal organs and other organs are caused. The present invention for enhancing the effect of trunk axis exercise in a supine or seated state helps not only a person who has an exercise habit but also a person who does not have an exercise habit to efficiently feel it. Therefore, the present invention provides exercise habit and is also effective for weight loss/tightening and prevention of lack of physical strength, stiff shoulder, cold, swelling (poor blood circulation), stress, low back pain, knee pain, osteoporosis, and compression fracture. There is a tendency that an adult cannot control the autonomic nerve or the like that has been controlled by himself/herself at the time of childhood and relies on medicine. However, it is important to be able to perform control by one's own autonomic nerve normally without relying on medicine as much as possible.

(3) Higher Effect than Personal Trainer: Reason why Effect is Higher than Personal Trainer and Personal Trainer that also Performs Bodywork For example, since golfers do not use their bodies symmetrically, their body balance is distorted and they often suffer from pain around the backbone, in the lumbar spine, in the cervical spine, and in the thoracic spine. According to the present invention, when the backbone is located at the correct position in a symmetrical manner, the effect of improving the pain around the backbone is high. By guiding the way of using the body so as to be different on the left and right to the way of using the body so as to be same on the left and right, there is an effect of improving the physical condition while strengthening the periphery of the spine. Acquiring the trunk axis that is not moved prevents injuries, and as a result, there is an effect of improving performance and prolonging player life. Even in our hospital, patients who are professional golfers and armatures and have visited the hospital for the purpose of improving low back pain not only have improved low back pain but also have a great effect on increasing the accuracy and the flying distance of golf.

In addition, in the present invention, when a machine for loosening the stiffness around the backbone is used, the stiffness is loosened in a symmetrical manner by correcting the trunk axis, and there is an effect of adjusting the balance of the body and enhancing the bodywork effect.

Since many sports, dances, and martial arts cannot be performed symmetrically in most cases, correcting the distortion of the body and the distortion of the backbone due to those sports also serves as prevention of injuries, and there are an effect and an achievement of being able to play for a long time as well as an effect of enhancing the playing accuracy.

Walking and running in a state where the body wobbles are inefficient in terms of bodywork mechanics, physiology, and physics, but since it is possible to learn from walking to running in a state where the body does not wobble, it is effective for improving sports ability.

During the growth period, the body balance is bad, so that many parents as well as the child who cannot exhibit the original exercise ability think that he/she is not athletic. However, by adjusting the trunk according to the present invention, the running speed is increased and the exercise ability is also increased, so that the physical ability is improved, the memory ability is improved, the academic achievement is improved, and the positive thought is obtained.

For example, the Tokyo Olympics will be held in 2020, but any competition puts a burden on the backbone. When playing for hours a day, it is essential that each block of the backbone is maintained in a state in which a burden is hardly applied. The basic exercise motion is walking, and there are running and exercise motion in extension of walking. Therefore, the present invention is effective in improving the body maintenance and the ability for all the thirty-three Olympics sports including swimming, archery, athletics, badminton, baseball/softball, basketball, boxing, canoeing, cycling competition, equestrian, fencing, football, golf, gymnastics, handball, field hockey, judo, karate, modern pentathlon, sailing, rugby, sailing, shooting, skateboarding, sport climbing, surfing, table tennis, taekwondo, tennis, triathlon, volleyball, weightlifting, and wrestling.

(4) Higher Effect than Walking Lesson Instructor: Reason why Effect is Higher than Walking Lesson Instructor Who also Conducts Walking Lesson and Bodywork Although the present inventor teaches walking by using the tool related to the present invention to a finalist of Miss. Earth, and, although the finalist has taken a walking lesson in order to win the competition in each area, there is an achievement that the use of the tool related to the present invention further stabilizes the positions of the head and the backbone during walking, thereby increasing the walking lesson effect.

Regarding walking, walking can be performed unconsciously or consciously. In particular, beauty contests seeking beauty have high factors requiring conscious walking. On the other hand, regarding the walking instruction to a patient as a medical treatment effect and a therapy effect, since it is difficult to always consciously lead daily life, a patient may be made conscious. However, even in an unconsciously walking state, it is necessary to learn walking that does not apply a burden to joints.

Humans have changed from quadruped walking to bipedal walking and upright bipedal walking in the course of evolution, but since the backbone is like a bridge at the time of quadruped walking, the person has a sense of stability. However, in the course of evolution to upright bipedal walking, the cervical spine and the lumbar spine are curved oppositely, and the scapula is also likely to move forward. Therefore, the person has no sense of stability, and the person has a state of being apt to have a poor posture, specifically, a posture that is also referred to as so-called hunched back. This is a reason why humans have a walking posture/posture that makes it difficult to maintain a medical good health state. According to the present invention, a force that pulls the scapula backward in a state where the wobbling of the skull is really small in a seated or supine state is transmitted to the cervical spine, the thoracic spine, the lumbar spine, the pelvis, the hip joint, the knee joint, the ankle, the knee, and the thenar eminence. For example, by inputting, to the brain, a walking motion nerve circuit that can naturally perform a walking motion in which the left foot is moved forward at the time of a walking motion in which the left scapula is pulled backward and the left arm is pulled backward, and by inputting, to the brain, a walking motion nerve circuit that can naturally perform a walking motion in which the right foot is moved forward at the time of a walking motion in which the right scapula is pulled backward and the right arm is pulled backward, which can be said to be a reverse walking motion. In this way, it is possible to easily learn a walking motion in which the spine is turned in an upright state while swinging the left and right limbs. Therefore, it is effective to improve a symptom in each medical field by learning a good walking for the body according to the present invention. In addition, according to the present invention, the periphery of the spine is prepared. Therefore, the nerve compression that causes pain is eliminated, the backbone is located at the position where the pain is not felt, the backbone is located at the position where the blood vessels flow without delay, and the way of using the body is such that the brown fat cells around the scapula always easily burn even if the person is not conscious. Therefore, the elimination and disappearance of pain and diet effect are enhanced.

(5) Higher Effect than Care Instructor

In a nursing care facility or the like, for example, a patient whose walking speed is slow is moved by a caregiver pulling a hand at the time of walking, which is also a cause that the shortage of manpower is not always solved in nursing care. However, the problem is that there is no means to fundamentally strengthen the muscle strength, and thus the ability is remarkably deteriorated year by year. For this reason, a product that assists walking by being attached to the body and increases the walking speed is also introduced in the care field. However, it takes time to attach the product, and it is necessary to prepare each device to attach the product for each person. In addition, since the product is used in a state where the skull is located on the backbone, a compressive force from above is applied to the backbone, and there is no force of pulling the scapula back and no effect of forming muscles while adjusting each block of the backbone. Although it is inefficient, there is no other product that can improve walking ability by optimization, and thus the product is used in the care field.

The use of the present invention solves these problems, and there is an effect that the walking posture of a patient or the like having a slow walking speed is adjusted and the walking speed is increased. In addition, when a person having a trouble in walking is sleeping on a bed, the present invention can be placed beside a user and used on the bed, and there is also an effect of improving the wobbling of the body at the time of walking. Therefore, the present invention is practical, and in the care field, the present invention can contribute to the elimination of the burden on the caregiver, the shortage of manpower, and the improvement of the quality of life of the user.

In dementia, there have been clinical results (treatment and therapy effects) in which symptoms of dementia are improved, such as an increase in memory ability and an increase in conversation ability of patients with dementia, for various reasons such as an increase in blood flow in the brain, regeneration of memory cells in the brain, improvement in command ability to the body, improvement in exercise ability, and an increase in brain oxygen amount. Even in a patient who is recognized as being unlikely to recover any more in the future by a doctor specializing in dementia, the above-described symptom improvement is observed, and thus there is an improvement effect such that the doctor who has recognized the patient has discarded a document specifying that only the deterioration of the symptom can occur in the future due to the symptom fixation.

In presbyopia and cataract, the visual acuity adjustment function of the crystalline lens decreases due to the decrease in muscle around the eye, and the elasticity of the crystalline lens, which is similar to the lens due to the function, decreases, so that the crystalline lens becomes cloudy and the visual field tends to be poor. However, since the eyeball and the optic nerve have a structure in which the brain directly comes out of the body, the decrease in the cognitive ability of the visual field naturally leads to the decrease in the normal function of dementia. Therefore, by using the product of the present invention which is effective for the improvement of these symptoms, there are many results having an effect of improving presbyopia and cataract, and there are many results having an effect of improving glaucoma and a visual acuity recovery effect. The improvement in command ability to muscles and muscle fibers by the optic nerve from the brain and the motor nerve leads to improvement in exercise ability, which can greatly contribute to an aging society.

(6) Higher Effect than Treatment Effect and Preventive Effect of Oriental Medicine In oriental medicine, there is Chinese medicine, preventive medicine is regarded as important, and prevention of presymptomatic disease is the basis of learning. The present invention that exerts a great effect in preparing qi blood water has an effect of preventing presymptomatic disease, which is aimed in Chinese medicine, and the effect is high. Performing without moving the head is highly effective because it directly leads to adjusting the balance between the skull and the cervical spine. The method that can be achieved by the present invention, which is muscle strengthening of optimization performed safely on the cervical spine in conjunction with the trunk, cannot be realized by conventional medical instruments and exercise therapies.

The purpose of the Chinese medicine is to adjust the qi blood water (increase the natural healing power), but qi: increase in breathing power due to expansion of the rib cage=increase in energy, blood: performing in the supine state where the brain and the lower body are parallel to the heart=blood flow is adjusted. Anemia causes wobble and fall due to the lack of oxygen in the brain, but the reason why consciousness is recovered is that the brain and the heart become parallel and the lack of oxygen in the brain is recovered. In the standing position, since the brain is located above the heart, when there is blood circulation failure (like thoracic outlet syndrome (one example)) in the backbone, particularly, from the thoracic spine to the cervical spine, the skull, and the scapula, blood stagnation occurs, and the natural healing power cannot be exhibited normally. According to the present invention, when the effect of correcting the position of each block of the backbone is enhanced, the natural healing power is enhanced. In addition, as can be seen from the fact that many patients have disorder of the valves of the veins that prevent backflow toward the heart, such as varicose veins, blood in the lower body is less likely to return to the upper body in the human body structure. The exercise therapy performed in the supine state in which the lower body and the heart through which the blood flows into the body are parallel to each other is more effective according to the present invention.

The lower body of a person easily swells and accumulates water poison. The body fluid circulation tends to deteriorate, but the circulation of the body fluid is also adjusted together with normalization and idealization of the blood flow. The present invention having an effect of adjusting qi blood water is effective for autonomic ataxia which is also an autonomic nervous system, cerebrospinal fluid reduction, headache, vertigo, depression, insomnia, acetabular labral tear, ankylosing spondylitis, fibromyalgia, pharyngeal cancer, prostate cancer, floaters, Parkinson's disease, and asthma. Also, the present invention having an effect of adjusting qi blood water is also effective for tinnitus, chronic fatigue, chronic fatigue syndrome, rheumatism, sprain, Basedow's disease, tunnel vision, sudden deafness, facial spasm, gingival pain, and temporomandibular joint disorder, which are also unidentified complaints, and is also effective, from a view point of oriental medicine, for allergic asthma, bronchitis, pediatric asthma, pollinosis, allergic rhinitis, allergic conjunctivitis, food allergy, sweat allergy, house dust, metal allergy, allergic urticaria, animal allergy, cystitis, chronic rhinitis, empyema, chronic otitis media, nose bleeding, choline dermatitis, meniere, panic disorder, eye fatigue, visual acuity reduction, hyperhidrosis, dry eye, sprained neck, and menopause disorder.

The present invention that enhances the effect of adjusting qi blood water exerts an effect also for stiff shoulder, shoulder periarthritis, hip joint pain, headache, sequelae of traffic accidents, numbness, tenosynovitis, rhinitis, extension of a movable area, nausea, abdominal pain, and correction of hunched back. Although this also applies to those described in the section of "(1) Effects on folk therapy performed as private practice", every human naturally has qi, and qi can be easily enhanced. Nevertheless, many folk therapies advertise the effect of enhancing qi to enhance medical effects, preventive effects, self-realization effects, and the like as selling points. However, according to the present invention, by strengthening the muscles while correctly adjusting each position of the blocks of the backbone, the effect of enhancing qi which is performed by those folk therapies can be further enhanced many times. Similarly, various kinds of folk therapies are taught and practiced as both of the meditation and the body are good and the self-realization effect is enhanced. However, according to the present invention, the meditative effect of performing at the correct position and the meditative effect of performing movement while moving are also enhanced.

Lifestyle-related diseases have been called adult diseases in the past, but the name gives an impression that an adult, so-called 20 years old, gets a disease, and the name has been changed in order to make people aware that diseases can be prevented by changing the lifestyle. The effect of the present invention is to change the lifestyle since it becomes a habit to use the body in the correct posture and the correct bone position at any time. The effect of the present invention is highly effective in improving nerve compression due to deformation of the backbone by adjusting the balance of each spinal block while strengthening the muscle strength. The preventive effect is also high. In the current method of performing while improving the muscle strength, it is difficult to return each block of the backbone to the correct position in a real sense. If a person does not perform muscle training, the muscle strength is always weakened. Along with the muscle weakness, the balance of the blocks of the spine is easily lost. According to the present invention, there is an effect of improving the distortion by correcting each block balance of the backbone to a correct position as well as strengthening the muscle strength by the correct trunk axis. Therefore, the present invention is an invention that not only makes the body less tiring, but also greatly helps the super-aging society that will come in the future. In the United States, chiropractic is performed by a doctor, and has acquired a basic patent that it is performed in a supine state in its home country. In clinical research results in our hospital, the chiropractic effect as well as the medical effects described above or more than that have been continuously exhibited. It is possible to exert the effect of adjusting the balance of each block of the spine rather than bodywork by performing while strengthening the muscle strength in a supine state that is a state where the backbone is not compressed by the gravity from above.

Although the preferred embodiments of the present invention have been described above, the technical scope of the present invention is not limited to the scope described in the above-described embodiments. Various modifications or improvements can be made to each of the above embodiments.

For example, in the above-described embodiment, it has been described that the present invention is used together with the abdominal and lumbar muscles training tool 100, but the present invention is not limited thereto, and the present invention can be used together with various exercise tools. Examples of such exercise tools include a bench press, a stretch machine, a Pilates machine, a Pilates exercise tool, an exercise tool for keeping balance, a balance ball, a rubber tube, a chest press, a seated row, a biceps curl, a biceps press, a triceps press, an abdominal, a leg curl, a back extension, a hip adduction, a seated leg curl, a leg extension, a pectoral fly/rear deltoid, a leg press, a low/rear deltoid, an arm curl, a chest press, an assist dip/chin, a seated row, a triceps press, a lat pull down, and the like. In addition, sheets such as a yoga mat are also included in the exercise tool of the present invention. These exercise tools may be used in a seated state in addition to those used in a supine state, and in this case, the exercise assist tool is configured to be disposed in front of the face of the user M in a seated state. In addition, a rolling bed, a water massage, a massage machine, and the like may also be said to have a stretching effect or a bodywork effect by loosening muscles. In this case, the bodywork effect is enhanced by being conscious of the trunk axis according to the present invention. Even a corrective tool such as a massage bed which is used or a pillow used for treatment, as long as it has a bodywork effect, use of the present invention improves the correction and the bodywork effect.

In the above-described embodiment, it has been described that the exercise assist tool 1 includes the support portion 20 that supports the body-axis indicator 10, and the exercise assist tool 1 is a stand-alone type in which the support portion 20 is placed on the bed 2, but the present invention is not limited thereto, and the installation mode of the body-axis indicator 10 can be optionally changed. For example, the exercise assist tool 1 may be a body-axis indicator (not illustrated) fixedly (integrally) or detachably provided on the bed 2 or a part of the exercise tool (for example, the self-weight pressing plate 102 or the like when the exercise tool is the above-described abdominal and lumbar muscles training tool 100), or may be a body-axis indicator 10' fixedly or detachably attached to a wall W (see FIG. 4(*a*)), a ceiling S (see FIG. 4(*b*)), or the like.

Figure 4:
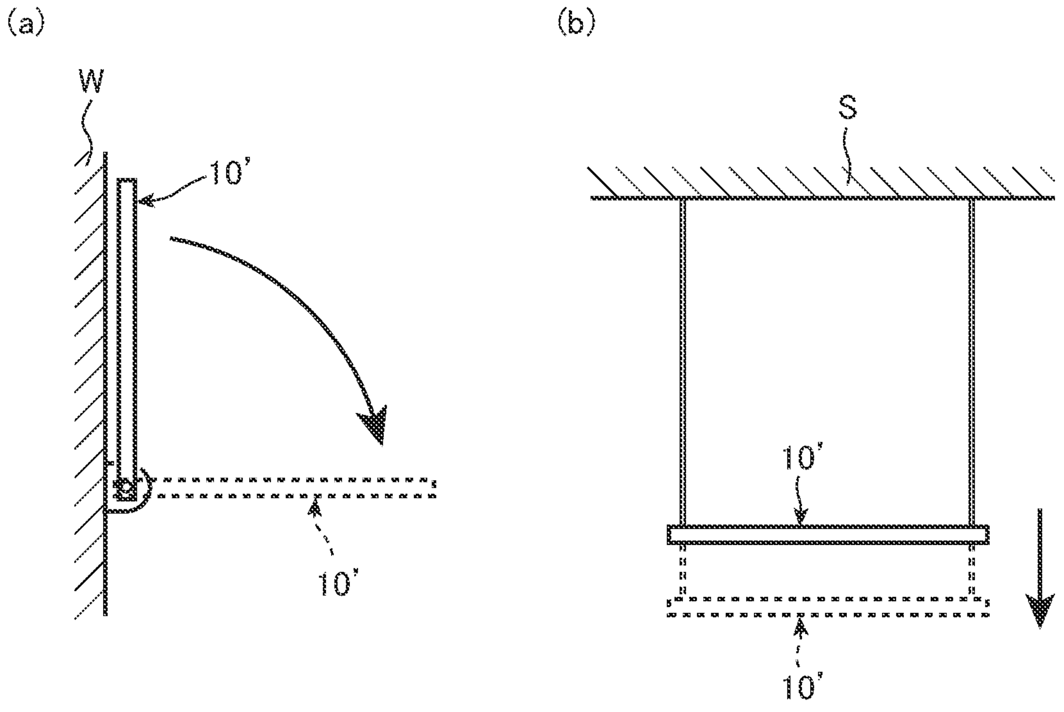
FIG. 4 is a view illustrating another example of the exercise assist tool.
Figure 5:
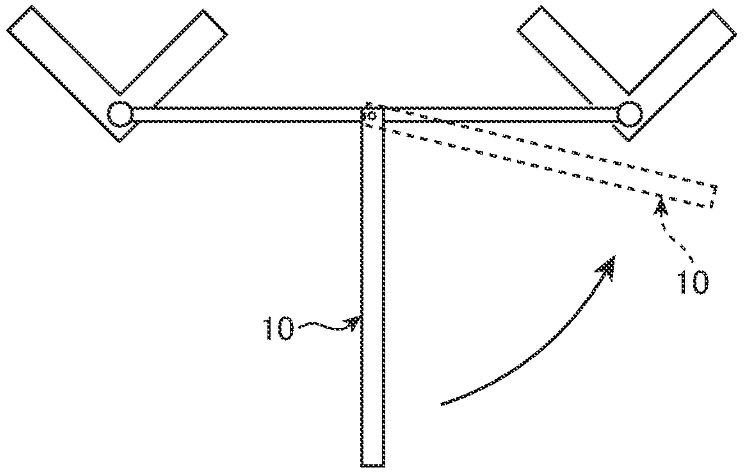
FIG. 5 is a view illustrating another example of the exercise assist tool.

In the above-described embodiment, it has been described that the body-axis indicator 10 is fixed to the support portion 20, but the present invention is not limited thereto, and various configurations such as a configuration in which the body-axis indicator 10 is rotatable in the horizontal direction (see FIG. 5) and a configuration in which the body-axis indicator 10 is rotatable in the vertical direction (see FIG. 4(*a*)) can be adopted.

In the above-described embodiment, it has been described that the distance between the proximal-side indicator 12 and the user M can be adjusted by adjusting the length of the connecting members 16, but the present invention is not limited thereto, and instead of or in addition to this configuration, a configuration in which the distance between the proximal-side indicator 12 and the user M and the distance between the distal-side indicator 14 and the user M can be adjusted by moving the position of the distal-side indicator 14 up and down may be adopted.

In the above-described embodiment, it has been described that both one end portion and the other end portion of the proximal-side indicator 12 in the longitudinal direction are connected to the distal-side indicator 14 by the connecting members 16, so that the proximal-side indicator 12 and the distal-side indicator 14 are aligned in the vertical direction, and the extending directions of the proximal-side indicator 12 and the distal-side indicator 14 always coincide with each other, but the present invention is not limited thereto.

Figure 10:
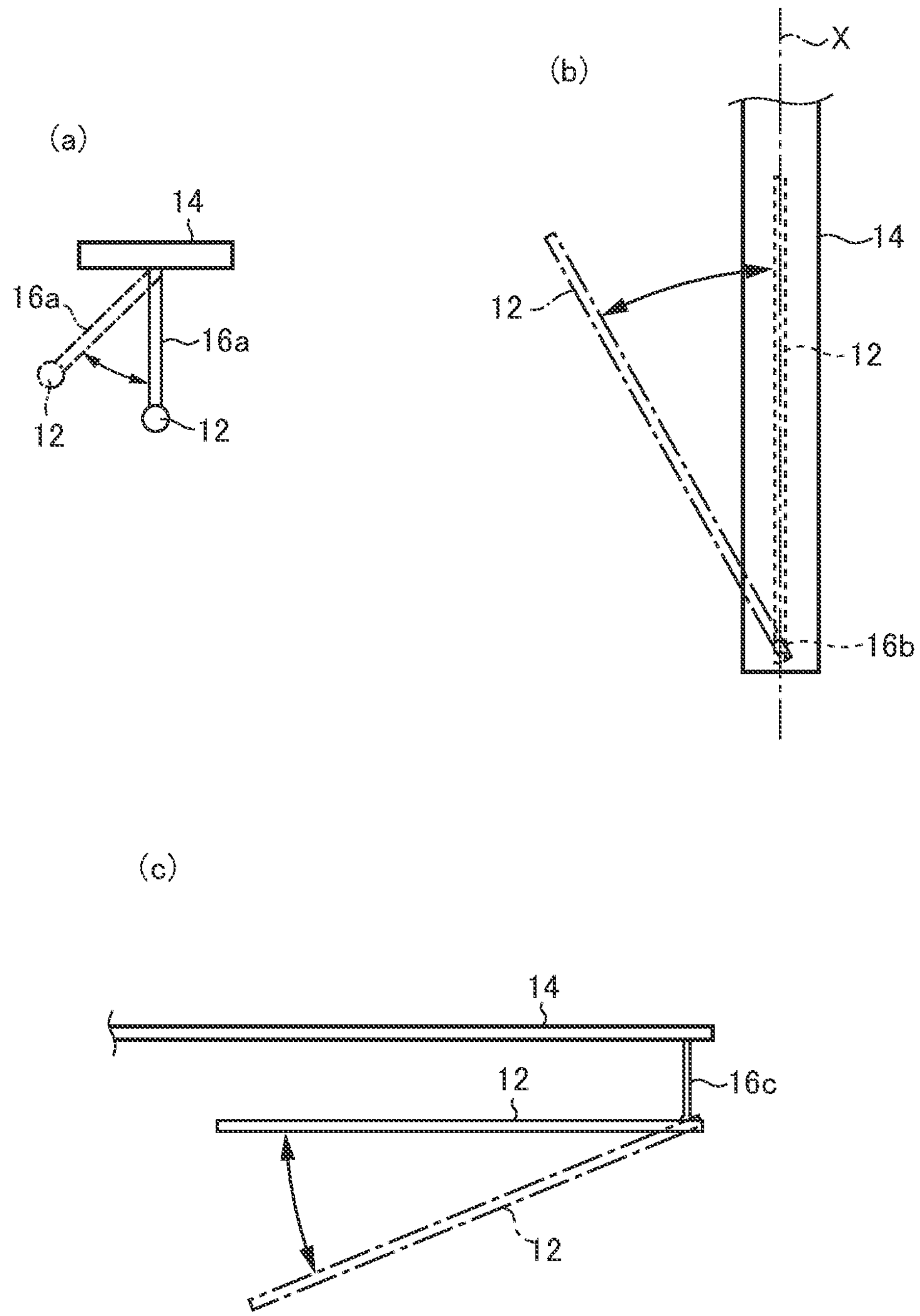
FIG. 10 is a view illustrating another example of the exercise assist tool.

For example, as illustrated in FIG. 10(*a*), the connecting member may have a configuration of a swing member 16*a* that supports the proximal-side indicator 12 in a swingable state with respect to the distal-side indicator 14. According to such a configuration, by swinging the proximal-side indicator 12 around the distal-side indicator 14, the position of the proximal-side indicator 12 in the vertical direction can be shifted from the position of the distal-side indicator 14 in the vertical direction. Therefore, for example, it is possible to adapt to a patient or the like in which the face is hardened in a state of facing sideways due to symptoms such as stiff shoulder, whiplash, sequelae of a traffic accident, and aging. In the illustrated example, the configuration in which the proximal-side indicator 12 is swung with respect to the distal-side indicator 14 whose position is fixed has been exemplified, but the present invention is not limited thereto, and a configuration in which the position of the proximal-side indicator 12 is fixed and the distal-side indicator 14 is swung with respect to the proximal-side indicator 12 may be adopted, or a configuration in which both the proximal-side indicator 12 and the distal-side indicator 14 are swung with respect to the support portion 20 may be adopted. In the latter case, the proximal-side indicator 12 and the distal-side indicator 14 may be configured to be swingable in synchronization with each other, or may be configured to be swingable independently of each other.

In addition, the connecting member may be configured to connect the proximal-side indicator 12 and the distal-side indicator 14 in a state where one of the proximal-side indicator 12 and the distal-side indicator 14 is rotatable in the horizontal direction with respect to the other such that the extending direction of the proximal-side indicator 12 and the extending direction of the distal-side indicator 14 intersect each other. As such a connecting member, for example, as illustrated in FIG. 10(*b*), various configurations such as a configuration of a rotation shaft 16*b* that connects the proximal-side indicator 12 to the distal-side indicator 14 in a rotatable state and a universal joint (multi-joint connecting member) (not illustrated) that can freely change the position of the proximal-side indicator 12 with respect to the distal-side indicator 14 can be adopted. In the former configuration of the rotation shaft 16*b*, the rotation shaft 16*b* may be provided at the buttock side end portion of the proximal-side indicator 12 (see FIG. 10(*b*)), at the head side end portion of the proximal-side indicator 12 (not illustrated), or at the center position of the proximal-side indicator 12 in the longitudinal direction (not illustrated). According to such a configuration, the extending direction of the proximal-side indicator 12 and the extending direction of the distal-side indicator 14 are made different, and it is possible to be conscious of two different axes. Therefore, for example, it is possible to adapt to a patient or the like whose backbone is curved in the lateral direction. That is, in a case where the exercise assist tool according to the modification is used for such a patient, while one of the proximal-side indicator 12 and the distal-side indicator 14 is used as an indicator for being conscious of the ideal body axis extending straight toward the exercise tool, the other of the proximal-side indicator 12 and the distal-side indicator 14 can be extended along the body axis of the actual patient inclined with respect to the ideal body axis. With this, the deviation between the actual body axis and the ideal body axis can be made conscious, and the other of the proximal-side indicator 12 and the distal-side indicator 14 can be set to a position where the correction effect is high, whereby the correction effect can be further improved together with the exercise efficiency. In the illustrated example, the configuration in which the proximal-side indicator 12 is rotated with respect to the distal-side indicator 14 whose position is fixed has been exemplified, but the present invention is not limited thereto, and a configuration in which the position of the proximal-side indicator 12 is fixed and the distal-side indicator 14 is rotated with respect to the proximal-side indicator 12 may be adopted, or a configuration in which both the proximal-side indicator 12 and the distal-side indicator 14 are rotated with respect to the support portion 20 may be adopted. In the latter case, the proximal-side indicator 12 and the distal-side indicator 14 may be configured to be rotatable in synchronization with each other, or may be configured to be rotatable independently of each other.

Furthermore, the connecting member may be configured to connect the proximal-side indicator 12 and the distal-side indicator 14 in a state where one of the proximal-side indicator 12 and the distal-side indicator 14 is rotatable in the up-down direction (vertical direction) with respect to the other such that the extending direction of the proximal-side indicator 12 and the extending direction of the distal-side indicator 14 intersect each other. As such a connecting member, for example, as illustrated in FIG. 10(*c*), various configurations such as a configuration of a rotation shaft 16*c* that connects the proximal-side indicator 12 to the distal-side indicator 14 in a rotatable state and a universal joint (multi-joint connecting member) (not illustrated) that can freely change the position of the proximal-side indicator 12 with respect to the distal-side indicator 14 can be adopted. Also in this modification, the rotation shaft 16*c* can be provided at any position of the proximal-side indicator 12 such as the buttock side end portion, the head side end portion, or the center in the longitudinal direction. According to such a configuration, for example, since the proximal-side indicator 12 can be inclined in the up-down direction with respect to the distal-side indicator 14, for example, it is possible to improve a symptom in which it is difficult to pull the jaw or correct the posture to a correct posture. Also in this modification, the distal-side indicator 14 may be configured to rotate with respect to the proximal-side indicator 12, or both the proximal-side indicator 12 and the distal-side indicator 14 may be configured to rotate with respect to the support portion 20. Further, in the latter case, the proximal-side indicator 12 and the distal-side indicator 14 may be configured to be rotatable in synchronization with each other, or may be configured to be rotatable independently of each other.

The connecting member may have two or more configurations of the swingable configuration, the configuration rotatable in the horizontal direction, and the configuration rotatable in the up-down direction (vertical direction). In a case where all of these three configurations (swingable, horizontally rotatable, and vertically rotatable configurations) are provided, it is possible to three-dimensionally change the direction of one or both of the proximal-side indicator 12 and the distal-side indicator 14, and thus, it is possible to configure a more universal exercise assist tool.

In the above-described embodiment, the head of the user M is disposed with respect to the proximal-side indicator 12 and the distal-side indicator 14 in a state where the relative positions of the proximal-side indicator 12 and the distal-side indicator 14 are defined. However, the present invention is not limited thereto, and the head of the user M and the proximal-side indicator 12 may be disposed with respect to the distal-side indicator 14 in a state where the relative positions of the head of the user M and the proximal-side indicator 12 are defined. Specifically, instead of the configuration of the above-described embodiment, the proximal-side indicator 12 and the distal-side indicator 14 may be separated from each other without being connected, and the proximal-side indicator 12 may be attached to the head of the user M so that the proximal-side indicator 12 can freely move (swing, rotate horizontally, and rotate vertically) with respect to the distal-side indicator 14. Even with such a configuration, the inclination of the head of the user M can be recognized by visually recognizing the direction of the proximal-side indicator 12 with respect to the distal-side indicator 14.

Examples of the method for attaching the proximal-side indicator 12 to the head of the user M include, but are not limited to, a method in which the user M wears glasses, a cap, or the like to which the rod-shaped proximal-side indicator 12 is integrally attached, and a method in which the user M holds a member to which the rod-shaped proximal-side indicator 12 is integrally attached with the mouth. According to the latter method (method in which the user M holds it with the mouth), it is also possible to intuitively recognize symptoms such as distortion of the face, poor occlusion of teeth, malfunction of the temporomandibular joint, and temporomandibular joint disorder (parallelism between the upper teeth in the maxilla and the lower teeth in the mandible), and it is also possible to objectively recognize the degree of the symptoms or the like by measuring and quantifying the inclination angle or the like of the proximal-side indicator 12 with respect to the reference line (for example, the line connecting both eyes). Then, by such intuitive recognition and objective recognition, it is possible to perform a therapy or the like after recognizing own symptoms, and it is possible to feel the effect of improving symptoms by comparing before and after the therapy or the like.

Figure 11:
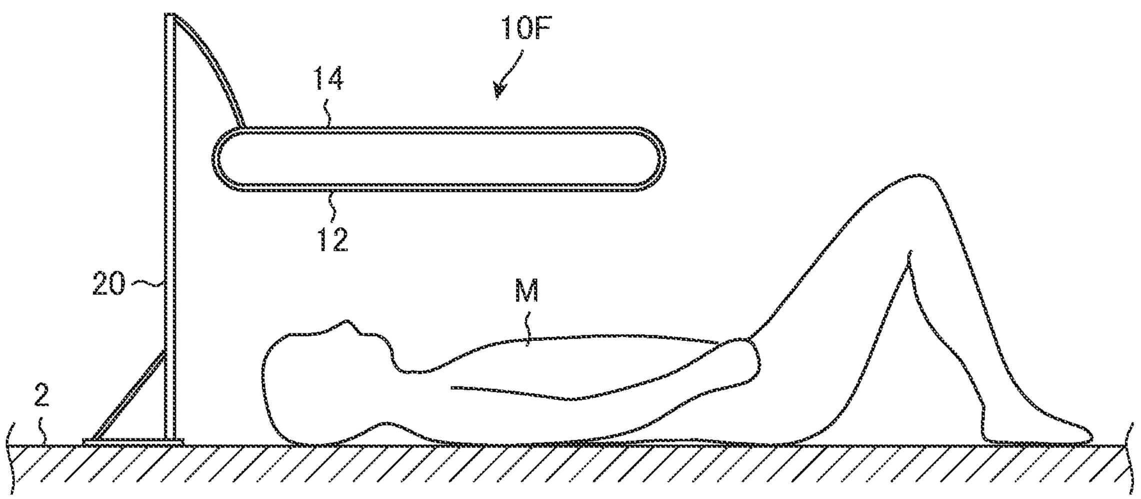
FIG. 11 is a view illustrating another example of the exercise assist tool.

Furthermore, in the above-described embodiment, it has been described that the proximal-side indicator 12 and the distal-side indicator 14 are rod members formed separately, but the present invention is not limited thereto, and it is also possible to adopt a body-axis indicator in which the proximal-side indicator 12 and the distal-side indicator 14 are integrated, for example, a body-axis indicator 10F such as an annular shape in which one end portions and the other end portions of the proximal-side indicator 12 and the distal-side indicator 14 are continuous with each other as illustrated in FIG. 11. The configuration according to such a modification also has advantages similar to those of the body-axis indicator 10 according to the above-described embodiment.

Figure 12:
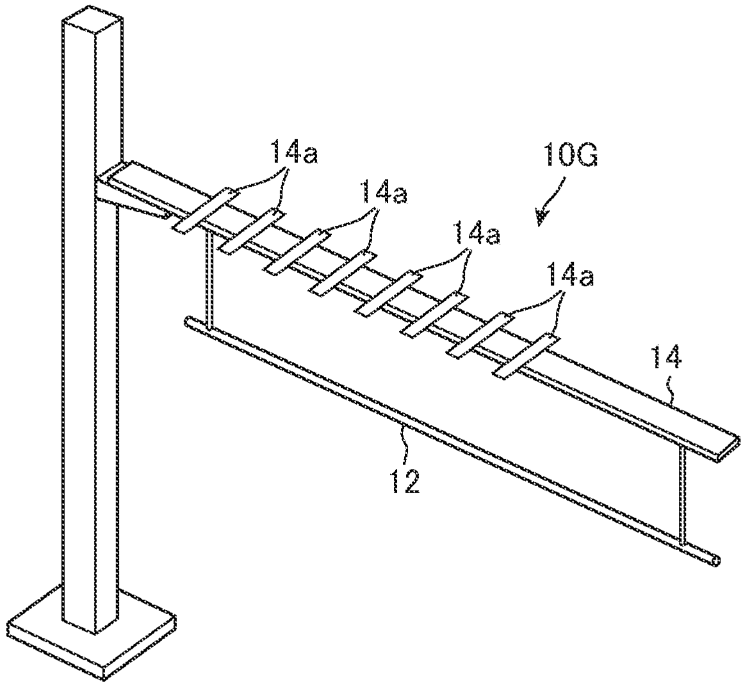
FIG. 12 is a view illustrating another example of the exercise assist tool.

Furthermore, in the above-described embodiment, the proximal-side indicator 12 and the distal-side indicator 14 are described as rod members extending along the craniocaudal axis X of the user M. However, the present invention is not limited thereto, and one or a plurality of left-right axis lines extending along the left-right axis (axis along the shoulder width direction of the body) may be further provided. For example, as illustrated in FIG. 12, the distal-side indicator 14 may include left-right axis lines 14*a* extending toward both left and right sides with the distal-side indicator 14 as a boundary (direction orthogonal to the extending direction of the distal-side indicator 14). In this case, only one left-right axis line 14*a* may be provided, or a plurality of (eight in the illustrated example) left-right axis lines may be provided at predetermined intervals along the extending direction of the distal-side indicator 14 as illustrated in FIG. 12. The left-right axis line 14*a* may be provided on the proximal-side indicator 12 or may be provided on both the proximal-side indicator 12 and the distal-side indicator 14. In addition to the advantages similar to those of the body-axis indicator 10 according to the above-described embodiment, a body-axis indicator 10G according to such a modification can recognize and correct not only the craniocaudal axis X but also the inclination of the neck, similarly to the above-described "mark having the left-right axis line".

Figure 13:
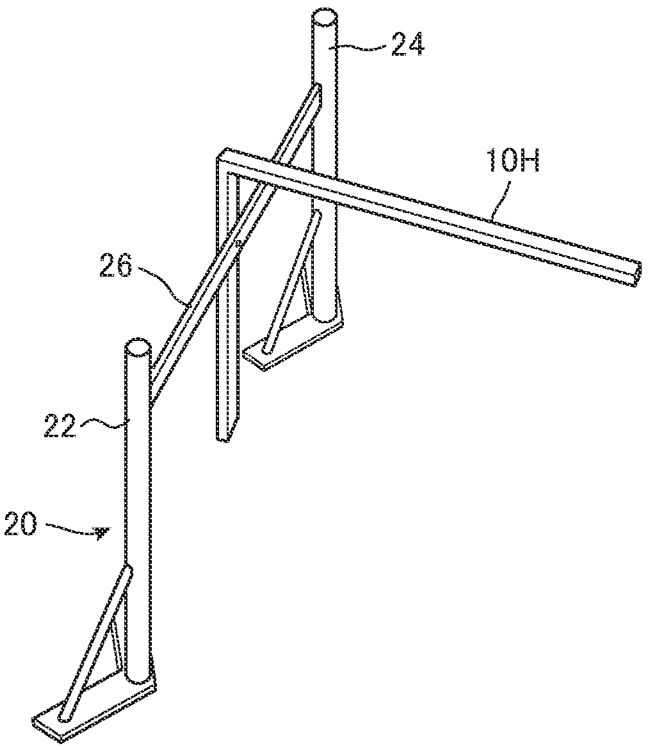
FIG. 13 is a view illustrating another example of the exercise assist tool.

Furthermore, in the above-described embodiment, it has been described that two (two axes) indicators of the proximal-side indicator 12 and the distal-side indicator 14 are provided, but the present invention is not limited thereto, and a configuration including three (three axes) or more indicators may be adopted, and a configuration including only one (one axis) indicator as illustrated in FIG. 13 may be adopted. Even with such a body-axis indicator 10H including only one (one axis) indicator, the user M can also be conscious of the craniocaudal axis X, so that it is possible to suppress movement of the body axis during exercise and to improve the exercise efficiency and the effect.

In the above-described embodiment or modification, a part of the indicator formed in a rod shape may be deformable in any direction. For example, it is also possible to adopt a configuration in which the vicinity of the buttock side end portion of the proximal-side indicator 12 and/or the distal-side indicator 14 can be optionally bent in the horizontal direction or the vertical direction. According to such a configuration, it is possible to cope with more various therapies.

In the above-described embodiment, the body-axis indicator 10 has been described as a "line" configuration (rod member) extending along the craniocaudal axis X of the user M. However, the present invention is not limited thereto, and various configurations can be adopted as long as the user M can recognize the body axis.

Figure 6:
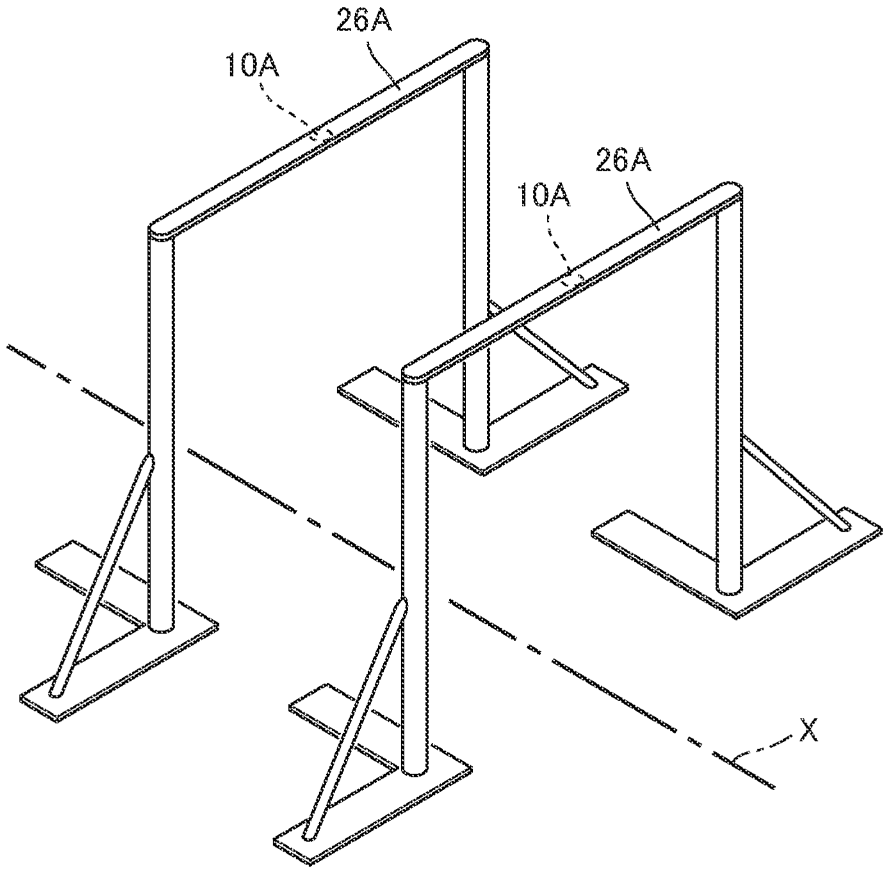
FIG. 6 is a view illustrating another example of the exercise assist tool.

For example, the body-axis indicator may have a configuration of two or more marks 10A and 10A provided to be spaced apart along the craniocaudal axis X of the user M as illustrated in FIG. 6. Even with such a configuration, it is possible to be conscious of the craniocaudal axis X by the virtual line connecting the two or more marks 10A and 10A, and thus, it is possible to exhibit the same effect as that of the above-described embodiment. Furthermore, according to the example illustrated in FIG. 6, a pair of parallel suspension portions 26A and 26A arranged in front of the face of the user M makes it possible to recognize the movement of the left-right axis (axis along the shoulder width direction of the body) of the user M, so that the movement of the body axis can be more accurately recognized.

Figure 7:
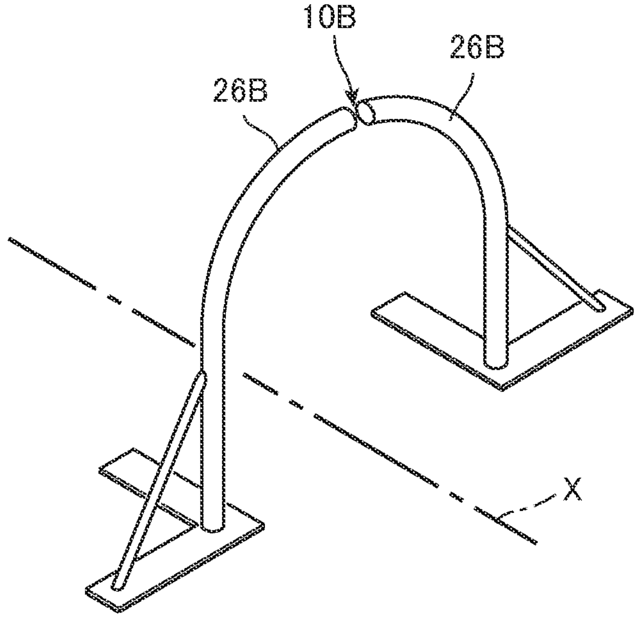
FIG. 7 is a view illustrating another example of the exercise assist tool.

As another example, the body-axis indicator may have a configuration of a gap 10B formed in a suspension portion 26B as illustrated in FIG. 7. Even with such a configuration, it is possible to be conscious of the craniocaudal axis X by the extension length of the gap 10B, and thus, it is possible to exhibit the same effect as that of the above-described embodiment.

Figure 8:
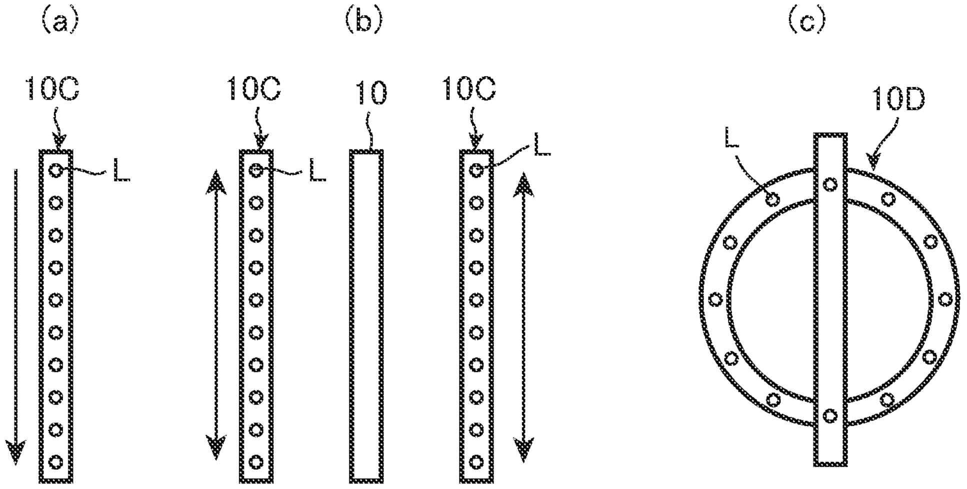
FIG. 8 is a view illustrating another example of the exercise assist tool.

Furthermore, as another example, the body-axis indicator may be configured to turn on and blink a light source such as an LED as illustrated in FIGS. 8(*a*) to 8 (*c*).

For example, as illustrated in FIG. 8(*a*), a body-axis indicator 10C in which a plurality of point light sources L are provided in a line along the craniocaudal axis X of the user M may be adopted. In this configuration, for example, by sequentially turning on or blinking the plurality of point light sources L from the head side to the leg side or from the leg side to the head side of the user M, or by simultaneously turning on or blinking all the point light sources L, it is possible to be conscious of the craniocaudal axis X.

In addition, for example, as illustrated in FIG. 8(*b*), such a body-axis indicator 10C including the point light sources L in one row may be provided in two rows in parallel so as to sandwich the body-axis indicator 10 according to the above-described embodiment. Even in this configuration, it is possible to be conscious of the craniocaudal axis X by sequentially or simultaneously turning on or blinking the plurality of point light sources L. In the exercise assist tool according to the modification, the interval between the left and right body-axis indicators 10C and the intermediate body-axis indicator 10 may be optionally adjustable, or the intermediate body-axis indicator 10 may be rotatable in the horizontal direction and/or the up-down direction (vertical direction) with respect to the left and right body-axis indicators 10C such that the extending direction of the intermediate body-axis indicator 10 and the extending direction of the left and right body-axis indicators 10C intersect each other. In the former configuration in which the interval is adjustable, the intermediate body-axis indicator 10 can be disposed closer to one body-axis indicator 10C (the position of the intermediate body-axis indicator 10 can be adjusted such that the interval between one body-axis indicator 10C and the intermediate body-axis indicator 10 is different from the interval between the other body-axis indicator 10C and the intermediate body-axis indicator 10). Further, in the latter rotatable configuration, the left and right body-axis indicators 10C may be configured to rotate with respect to the intermediate body-axis indicator 10, or all of the intermediate body-axis indicator 10 and the left and right body-axis indicators 10C may be configured to rotate with respect to the support portion (not illustrated) independently or in synchronization with each other. Even with these configurations, it is possible to adapt to a patient in which the face is hardened in a state of facing sideways due to symptoms such as stiff shoulder, whiplash, sequelae of a traffic accident, and aging, a patient whose backbone is curved in the lateral direction, and the like.

Further, for example, as illustrated in FIG. 8(*c*), a body-axis indicator 10D in which the point light sources L are provided in a substantially circular shape so as to surround the face of the user M may be adopted. Even in this configuration, it is possible to be conscious of the craniocaudal axis X by sequentially or simultaneously turning on or blinking the plurality of point light sources L.

According to the body-axis indicator using such light sources, it is possible to be conscious of the craniocaudal axis X by the light reaching the eyes through the eyelids even in a state where the eyes are closed. In addition, the motion of tracking the lighting or blinking of the point light sources L with the eyes also serves as eye muscle training, and thus contributes to the correction of the eye function. Furthermore, by changing the lighting (or blinking) of the point light sources L to blinking (or lighting) or changing the light emission color of the point light sources L according to the progress status of the therapy or the like, it is also possible to notify the user M or the practitioner performing or teaching the therapy on or to the user M of the progress status of the therapy, the change timing of the therapy content, or the like. In these modifications using the light sources, it is possible to use a type of light source that is good for the eyes and the skin and is good for beauty and health, such as a light source capable of emitting a light beam contributing to blood circulation promotion, but the light source is not limited thereto. In addition, instead of or in addition to the light source, means for emitting ultrasonic waves, waves, vibrations, or the like can also be adopted.

Figure 9:
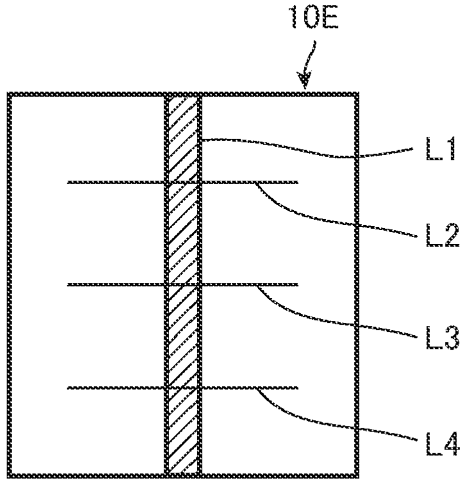
FIG. 9 is a view illustrating another example of the exercise assist tool.

Furthermore, as another example, the body-axis indicator may adopt a configuration in which a panel or the like on which a display capable of being conscious of the body axis is printed is disposed in front of the face. Specifically, as illustrated in FIG. 9, the body-axis indicator may be a transparent panel 10E in which a craniocaudal axis line L1 extending along the craniocaudal axis X and a plurality of left-right axis lines L2 to L4 extending along the left-right axis (axis along the shoulder width direction of the body) and parallel to each other are illustrated. Even with such a configuration, it is possible to be conscious of the craniocaudal axis X by the craniocaudal axis line L1, and thus, it is possible to exhibit the same effect as that of the above-described embodiment. It is also possible to be conscious of the left-right axis by the left-right axis lines L2 to L4, and thus, it is possible to more reliably suppress the movement of the body axis.

Furthermore, in the above-described embodiment, it has been described that the body-axis indicator exists as a physical object, but the present invention is not limited thereto, and a configuration may be adopted in which a screen for displaying a video that allows the user M to be conscious of the body axis is disposed in front of the face, or goggles (VR goggles or the like) for displaying the video are worn. As the "video that allows the user M to be conscious of the body axis", for example, a video of the body-axis indicator according to the above-described embodiment or modification can be adopted. In the configuration in which such a video is displayed, it is preferable that the video changes according to the movement of the head of the user M.

Furthermore, although the body-axis indicator exemplified above allows the user M to be conscious of the body axis mainly through the visual sense of the user M, the body-axis indicator is not limited thereto, and the body-axis indicator may be configured to allow the user M to be conscious of the body-axis through one or more of the five senses (visual sense, hearing sense, tactile sense, taste sense, and olfactory sense) of the user M. For example, a configuration may be adopted in which a plurality of speakers and the like disposed around the bed are sequentially output, and sound is recognized through hearing sense (otoliths in the inner ear) so that the body axis can be recognized. In addition, a configuration may be adopted in which the body axis can be recognized through tactile sense by blowing wind to the user M or bringing an indicator, a practitioner's hand, or the like into contact with the body of the user M.

In addition, the body-axis indicator according to the above-described embodiment or modification has been described on the assumption that the body-axis indicator can be configured to allow the user M to be conscious of the craniocaudal axis X of the user M. However, the body-axis indicator is not limited to this, and may be configured to allow the user M to be conscious of a dorsoventral axis (axis along the dorsoventral direction of the body) and/or a left-right axis (axis along the shoulder width direction of the body) in addition to or instead of the craniocaudal axis X (axis along the body height direction).

It is apparent from the description of the claims that the above modifications are included in the scope of the present invention.

REFERENCE SIGNS LIST

1 exercise assist tool
2 bed

10, 10', 10A to 10H body-axis indicator
12 proximal-side indicator
14 distal-side indicator
16, 16*a*, 16*b*, 16*c* connecting member
20 support portion
22, 24 leg portion
26, 26A, 26B suspension portion
100 abdominal and lumbar muscles training tool (exercise tool)

The invention claimed is:

1. An exercise assist tool, configured to be used together with an exercise tool configured to be used in a supine state,
the exercise assist tool comprising a body-axis indicator that allows a user to be conscious of a body axis,
wherein the body-axis indicator includes a proximal-side indicator configured to be provided in front of a face of the user, and a distal-side indicator provided farther from the user than the proximal-side indicator,
wherein at least one of the proximal-side indicator and the distal-side indicator has a longitudinal direction,
wherein the exercise assist tool further includes a support portion that supports at least one of the proximal-side indicator and the distal-side indicator such that the longitudinal direction of at least one of the proximal-side indicator and the distal-side indicator can be disposed along a craniocaudal axis of the user in the supine state, and
wherein the proximal-side indicator is configured to be disposed between the face of the user and the distal-side indicator.

2. The exercise assist tool according to claim 1,
wherein at least one of the proximal-side indicator and the distal-side indicator is a rod member supported so as to be disposed along a craniocaudal axis of the user.

3. The exercise assist tool according to claim 1,
wherein the proximal-side indicator is configured to be capable of adjusting a distance from the user.

4. A method for using an exercise assist tool together with an exercise tool configured to be used in a supine state,
the exercise assist tool including a body-axis indicator and a support portion,
wherein the body-axis indicator includes a proximal-side indicator configured to be provided in front of a face of a user, and a distal-side indicator provided farther from the user than the proximal-side indicator,
wherein at least one of the proximal-side indicator and the distal-side indicator has a longitudinal direction,
wherein the support portion is configured to support the body-axis indicator such that the longitudinal direction of at least one of the proximal-side indicator and the distal-side indicator can be disposed along a craniocaudal axis of the user in the supine state,
wherein the proximal-side indicator is configured to be disposed between the face of the user and the distal-side indicator, and
the method comprising using the exercise tool in a state where the exercise assist tool is disposed such that the longitudinal direction of at least one of the proximal-side indicator and the distal-side indicator is along the craniocaudal axis of the user.

* * * * *